Nov. 19, 1935.  H. WHEELER ET AL  2,021,440
THERMOSTATIC DEVICE
Filed April 20, 1933  2 Sheets-Sheet 1

INVENTORS
Harry Wheeler and
Brian Wheeler
BY William B. Jaspert
ATTORNEY.

Nov. 19, 1935.  H. WHEELER ET AL  2,021,440
THERMOSTATIC DEVICE
Filed April 20, 1933   2 Sheets-Sheet 2

Patented Nov. 19, 1935

2,021,440

UNITED STATES PATENT OFFICE 2,021,440

THERMOSTATIC DEVICE

Harry Wheeler, Tenafly, N. J., and Brian Wheeler, Erie, Pa.

Application April 20, 1933, Serial No. 666,996

5 Claims. (Cl. 200—139)

This invention pertains to thermostatic devices and more particularly to thermostatic devices having variable range of operation and adapted to control a plurality of heating units or mechanisms having a variable rate of operation.

We are familiar with prior thermostatic devices adapted at pre-determined maximum and minimum temperature limits to control an electric circuit whereby a heating unit may be intermittently operated. Such heating units are normally adjusted to operate at maximum load requirements and at less than maximum requirements operate at maximum capacity for a time sufficient to supply the heat demanded by the thermostat. However, when operating at this maximum capacity the heat losses due to radiation and flue gases are proportionally large.

We have devised an improved thermostatic device adapted to control a plurality of heating or like units which operating concurrently will supply the maximum amount of heat required, but at less than maximum requirements one or more of the units will be inoperative, the operating unit or units will thus have relatively less heat losses such as radiation and flue gas. Thus if the heat demanded is 50% of maximum requirements a single unit operating continuously will be more efficient than a unit operating at maximum capacity substantially 50% of the time.

It is an object of our invention, therefore, to provide an improved thermostatic device operatively connected to a plurality of electric circuits, the circuits being independently closed or opened at pre-determined temperature limits.

Another object of our invention is to provide an improved thermostatic device controlling a plurality of electric circuits, each of said circuits being opened or closed at a different temperature range of response.

Another object of our invention is to provide a thermostatic device controlling a plurality of electric circuits controlling heating or the like units adapted to maintain a mean temperature substantially continuously regardless of the number of heating units required to operate to maintain this mean temperature. The principle under which this is accomplished will hereafter be referred to as the principle of variable range setting.

Another object of our invention is to provide an improved thermostatic device controlling a plurality of electric circuits, each of said circuits having a different temperature range of operation but substantially the same mean temperature.

Another object of our invention is to provide an improved thermostatic device controlling a plurality of electric circuits controlling heating or the like units adapted to maintain a mean temperature and manual means for changing the mean temperature without substantial alteration of the temperature range of response.

Another object of our invention is to provide an improved thermostatic device adapted to operate a plurality of electric circuits at pre-determined maximum and minimum temperature limits and having means for individually changing each of said limits.

Another object of our invention is to provide a thermostatic device adapted to control one or a plurality of electric circuits at pre-determined temperature limits and having improved means for initially calibrating said temperature limits.

Another object of our invention is to provide an improved thermostatic device controlling an electric circuit having snap action mechanism having relatively narrow range of temperature response such as ½ degree or less and which is adapted to prevent arcing or fusing at the contact points.

These and other objects of our invention will become increasingly apparent from a consideration of the following description and drawings wherein like reference characters refer to like parts and wherein:—

Figure 1:
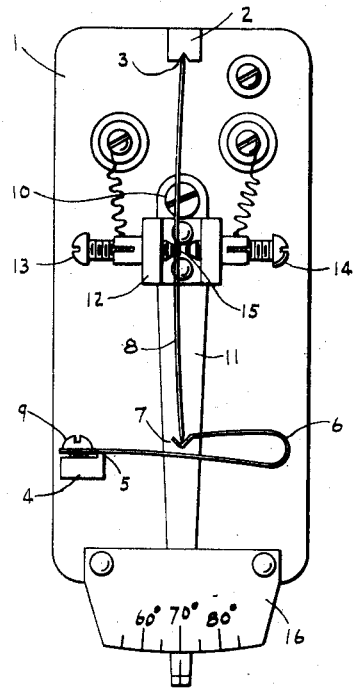
Figure 1 is a front elevational view of a preferred embodiment of our invention.
Figure 2:
Figure 2 is a side elevational view of the embodiment shown in Figure 1.

Referring to the drawings, we have shown at 1, a generally rectangular base preferably formed of metal having a pin 2 integrally secured to its upper end, the under side of the pin 2 being provided with a longitudinally extending V shaped notch 3.

Adjacent the lower end of base 1 is an integral stepped lug 4, the lug having a projecting ridge 5 along an upper edge thereof. Secured to the lug 4 is a spring 6, the spring being partially bent back on itself to form a U shaped section terminating in a V shaped groove 7.

Intermediate the pin 2 and spring 6 is a bimetallic generally rectangular strip 8, the upper end of strip 8 being positioned in groove 3 of pin 2 and the lower end being disposed in the groove 7 of spring 6.

The axial thrust exerted on the strip 8 may be adjusted by means of a screw 9 which secures the spring 6 to lug 4 since the spring 6 is fulcrumed about ridge 5. The strip 8 comprises two dissimilar metals bonded together and is normally in a flexed position due to the axial load exerted by spring 6. If such a strip be cooled, (or heated, dependent upon its initial direction of lateral flexure) it will at a certain temperature snap over to a state of flexure in the opposite direction. As is commonly known this is because the internal bending stresses due to thermal effects exceed the bending stresses due to flexure.

Pivotally supported by means of a screw 10 secured to base 1 is a pointer 11, the pointer 11 being secured so that it will remain in a desired position when manually moved.

Secured to the upper portion of the pointer 11 is a U shaped bracket 12 composed of a suitable insulating material and having embedded in aligned relationship in opposite arms of the bracket threaded sleeves adapted to engage screws 13 and 14. The screws 13 and 14 are provided with tips to provide suitable contact points with strip 8. The strip 8 is preferably provided with raised contact points as indicated at 15 to prevent arcing and fusing of the strip 8 in a manner well understood.

The lower end of pointer 11 is adapted to be moved between the base 1 and an indicating plate 16 which is spaced from the base 1 by means of forwardly projecting bosses 17—17.

The plate is marked within the temperature limits contemplated and by initially adjusting the axial load on strip 8 as hereinbefore described the strip may be made to flex at the desired temperature. The screws 13 and 14 will limit the flexing movement in a lateral direction whereby the range of temperature response may be controlled. It will be noted that the upper and lower temperature limits may thus be independently controlled. The range may be confined to close limits if desired such as ½ degree or less.

If for example a 2 degree range is desired at a mean temperature of 70 degrees, this will be accomplished by moving the pointer 11 to 70 degrees, the position indicated in Figure 1 and making suitable adjustments of screws 13 and 14. If a mean temperature of 80 degrees is desired with the same range, the pointer 11 is manually set at the mark 80 on plate 16, the temperature range remaining substantially the same. This provides a positive snap action thermostat which is easily constructed and provides an initial adjustment of the flexing stress and a range adjustment in addition to a mean temperature adjustment.

Figure 3:
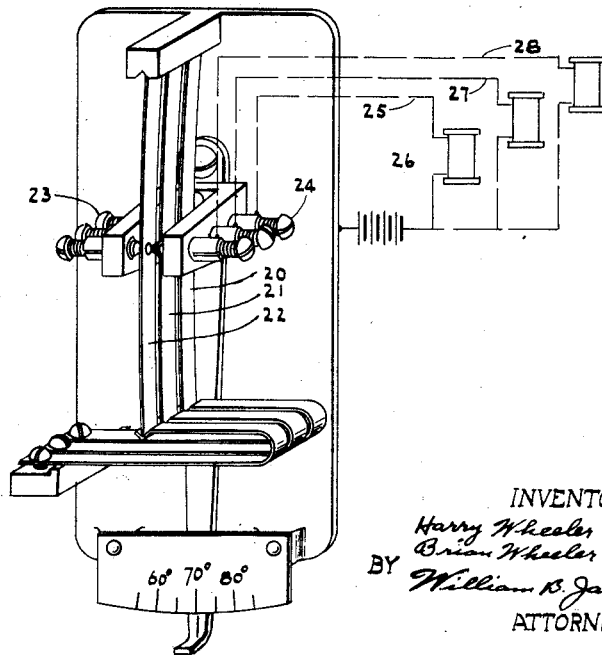
Figure 3 is a diagrammatic view showing a modified form of our invention wherein a plurality of electric circuits are independently controlled.

Referring now to Figure 3 wherein we have shown a generally similar thermostatic device but comprising three bimetallic strips as indicated at 20, 21 and 22.

The strip 20 through contact screws 23 and 24 operates an electric circuit 25. We have illustrated the circuit as including an electromagnet 26 but it is understood that any desired apparatus may be controlled.

In the same manner independent electric circuits 27 and 28 are responsive to the action of the bi-metallic strips 21 and 22 respectively.

Figure 4:
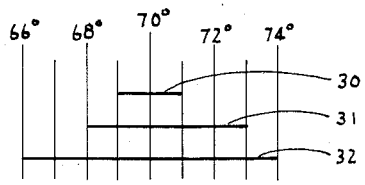
Figure 4 illustrates diagrammatically a particular adjustment which may be effected in the modification shown in Figure 3.
Figure 5:
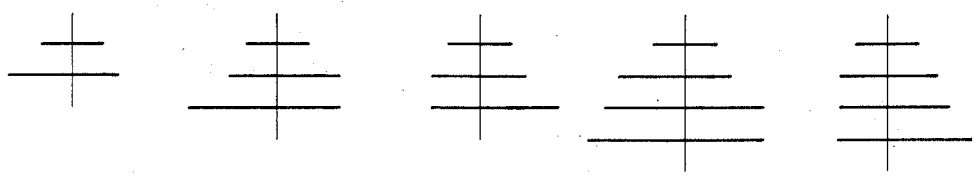
Figure 5 illustrates in a diagrammatic manner similar to Figure 4 other adjustments which may be made in modified forms of our invention which are adapted to control pluralities of electric circuits.

Referring now to Figure 4 the line marked 30 indicates that strip 20 has its stops or screws 23 and 24 so adjusted that it moves to close its circuit when the temperature falls to 69 degrees and moves to open its circuit when the temperature rises to 71 degrees.

In like manner the line marked 31 indicates that strip 21 moves to close its circuit when the temperature falls to 68 degrees and moves to open its circuit when the temperature rises to 73 degrees.

Similarly line marked 33 indicates that strip 22 moves to close its circuit when the temperature falls to 66 degrees and moves to open its circuit when the temperature rises to 74 degrees.

It will thus be observed that strip 20 operates with a temperature range of response of 2 degrees and at a mean temperature of 70 degrees.

In like manner strip 21 operates with a temperature range of response of 5 degrees and strip 22 with a range of response of 8 degrees.

Figure 6:
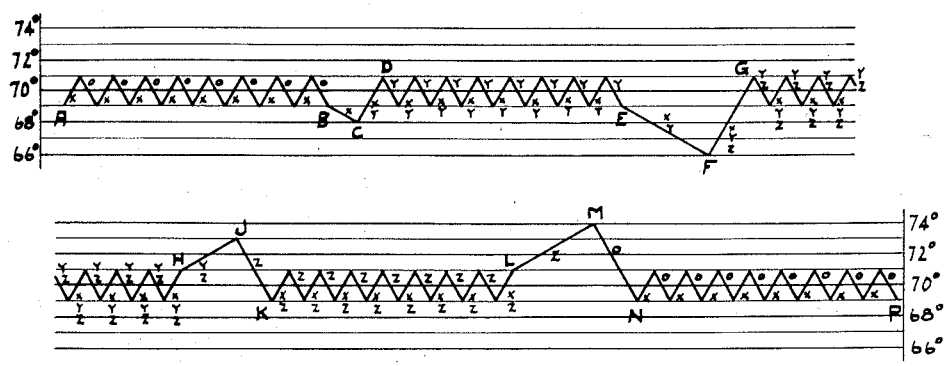
Figure 6 illustrates in chart form how the modification shown in Figure 3 when adjusted as illustrated diagrammatically in Figure 4 will maintain the selected mean temperature effected by a plurality of heating or the like units. Although the chart is shown in two sections the record is to be construed as continuous.

Referring to Figure 6 that portion of the heavy black line designated AB represents the rising and falling of the temperature during the time when conditions are such that the heat supplied by one unit is sufficient to raise the temperature from 69 degrees to 71 degrees.

The small letters alongside the temperature line indicate the particular units in operation during that portion of the cycle to which they are adjacent, thus:

The letter X represents the heating unit controlled by bi-metallic strip 20; the letter Y represents the heating unit controlled by bi-metallic strip 21; the letter Z represents the heating unit controlled by bi-metallic strip 22; the period during which no units are in operation is indicated by letter O.

When conditions change so that one heating unit cannot supply sufficient heat to raise the temperature, the temperature continues to fall as represented by the line BC until a temperature of 68 degrees is reached. At this temperature bi-metallic strip No. 21 turns on its unit, Y, and there are now two heating units in operation. Assuming that conditions are such that two heating units are sufficient to supply the heat required the temperature rises as indicated by the line CD and, as long as two units suffice the rising and falling of the temperature is as indicated by line DE, the small letters alongside the temperature line again indicating the particular heating units in operation.

If, when the point E is reached, conditions are such that two heating units cannot supply sufficient heat to raise the temperature, the temperature continues to fall as represented by the line EF until a temperature of 66 degrees is reached. At this temperature bi-metallic strip 22 turns on its unit, Z, and there are now three heating units in operation. Assuming that conditions are such that three heating units are sufficient to supply the heat required, the temperature rises as indicated by the line FG and, as long as three units suffice, the rising and falling of the temperature is as indicated by the line GH.

If, when the point H is reached, the conditions are such that two heating units can supply sufficient heat to still further raise the temperature the temperature continues to rise as represented by the line HJ until a temperature of 73 degrees is reached. At this temperature bi-metallic strip 21 turns off its unit, Y, leaving only unit Z in operation. If conditions are such that two units are necessary to supply the heat required the temperature falls as indicated by the line JK and as long as two units suffice the rising and falling of the temperature is as indicated by the line KL.

If, when the point L is reached, conditions are such that one unit can supply sufficient heat to still further raise the temperature, the temperature continues to rise as represented by the line LM until a temperature of 74 degrees is reached. At this temperature bi-metallic strip 22 turns off its unit, Z. The temperature then falls as represented by the line MN and as long as one unit suffices the rising and falling of the temperature will be as indicated by the line NP.

It is to be noted that except for a brief initiating period the mean temperature effected is substantially the mean temperature of the unit having the lowest maximum temperature and the highest minimum temperature.

The mean temperature maintained which is substantially that of the aforementioned unit is due to the peculiar relative adjustment of the several temperatures of response of the strips. Any cyclic fluctuation of the heat supplied by the heating units which is necessary to maintain a desired mean temperature always is accomplished by the intermittent operation of the unit controlled by strip 20, the heating units controlled by strips 21 and 22 being either continuously operated or continuously idle.

From the foregoing it is evident that the mean temperature maintained will be the mean temperature for which strip 20 is adjusted and that this mean temperature will be maintained substantially continuously regardless of the number of heating units required to operate to maintain this mean temperature.

The example given has been made comprehensive, and the temperatures of response have been selected arbitrarily in order to illustrate completely the principle of variable range setting. However, the same result, namely maintenance of a desired mean temperature regardless of the number of heating units in operation, may be obtained by relative adjustments or settings of thermostatic devices other than that described above, the essential principle being that at least one thermostatic device shall have, simultaneously, a lower maximum temperature of response and a higher minimum temperature of response than the other thermostatic devices.

Although we have shown and described embodiments of our invention it is understood that numerous and extensive departures may be made therefrom without departing from the spirit of our invention and the scope of the appended claims.

We claim:

1. A thermosensitive device comprising a plurality of bi-metallic strips, each strip being subjected to an axial buckling load, stops independently adjustable to limit said buckling, one of said strips having stops so adjusted that its flexure due to thermal stresses occurs at predetermined maximum and minimum temperature limits, the other strips being adapted to flex at relatively higher maximum and relatively lower minimum temperature limits, and means for concurrently altering said temperature limits without alteration of the temperature ranges.

2. A thermosensitive device comprising a plurality of bi-metallic strips, each of said strips being subjected to an axial flexing load and movable through the axis of pressure to occupy differently curved positions at either side of said axis, stops to limit said flexing, contact between each of said strips and its associated stops being adapted to control an electric circuit, the stops being adjusted whereby one of said circuits will be controlled at pre-determined maximum and minimum temperature limits and the remaining circuits will be controlled at relatively higher maximum and lower minimum temperature limits.

3. The combination of a plurality of thermosensitive devices, each being adapted to temperature range adjustment, one of said devices being adjusted for pre-determined maximum and minimum temperature limits and the other devices being adjusted for relatively higher maximum and lower minimum temperature limits, and means for concurrently altering the temperature limits without substantial alteration of the temperature range of each device.

4. The combination of a plurality of thermosensitive devices, each being adapted to temperature range adjustments, one of said devices having concurrently a higher minimum temperature of response and a lower maximum temperature of response than the respective minimum and maximum temperature of response of the other devices, and means for concurrently altering the temperature limits without substantial alteration of the temperature range of each device.

5. A thermostatic device comprising spaced rigid members, a bimetallic element, movable through an axis of pressure and engaged at one end by one of said members, a resilient element engaging the opposite end of the bimetallic element and secured to another of said members to adjustably place the bimetallic element under longitudinal compressive stress to flex the element, adjustable electric contacts to limit the flexing movement, the element being movably responsive to pre-determined thermostatic conditions to flex from a curved position on one side of the axis of pressure to a differently curved position on the opposite side of the axis and means for concurrently moving the contacts relative to the strip.

HARRY WHEELER.
BRIAN WHEELER.